Patented Apr. 6, 1943

2,316,141

UNITED STATES PATENT OFFICE 2,316,141

PREPARATION OF COMPOUNDS OF ZIRCONIUM, TITANIUM, AND HAFNIUM

Eugene Wainer, Niagara Falls, N. Y., assignor to The Titanium Alloy Manufacturing Company, New York, N. Y., a corporation of Maine No Drawing. Application July 17, 1940, Serial No. 346,059

10 Claims. (Cl. 260—429)

This invention relates to the preparation of compounds of fourth group elements. More particularly, it relates to a method of preparing zirconium, hafnium or titanium salts, especially of weak acids, and especially zirconium salts.

The elements zirconium, hafnium and titanium of the fourth group of the periodic table of the elements are known to produce salts of the empirical formula $(MO)_n X_2$, where M represents the element zirconium, hafnium or titanium, X represents an acid radical, and $n$ represents the valency of the acid radical. In those cases where $n$ is even (e. g. divalent or tetravalent acid radicals), the actual formula may be one-half that represented. Thus, in the case of a divalent acid such as sulfuric acid, the formula may be represented as $(MO)SO_4$ instead of $(MO)_2(SO_4)_2$. For the sake of simplicity, the single formula $(MO)_n X_2$ will be used to represent all cases. The preparation of stable salts or stable solutions of salts of this nature often presents considerable difficulties, especially in the formation of salts of weak acids, such as acetic, formic, citric, and the like. This is due to the fact that the oxides of these elements are in general insoluble in weak acids. Lightly calcined zirconia, for example, while soluble in strong mineral acids after prolonged digestion at elevated temperatures, is completely insoluble in weak organic acids. Freshly precipitated zirconium hydrate is much more soluble in acids than the calcined oxide, but even such a material is insoluble in organic acids such as acetic and formic. Furthermore, even when zirconium hydrate can be dissolved, it usually results in a product of indeterminate, indefinite and varying composition, hydrolyzing in water to varying degrees. Other ways have been devised by means of which some of these compounds can be made, but most involve roundabout methods including double decomposition and the formation of an insoluble precipitate, the desired material being obtained either in the filtrate or the precipitate. Naturally such a procedure is unavailing where both products of double decomposition are insoluble or both are soluble.

It is therefore an object of this invention to provide a novel, rapid and economical method of preparing zirconyl, hafnyl and titanyl salts of definite and unvarying composition. It is another object to prepare stable water solutions of such salts. It is a further object to provide such a method which can be applied to the preparation of practically all known salts of this nature. It is a still further object to provide such a method which can be practiced readily in the cold on simple stirring. Other objects will appear hereinafter.

These objects are accomplished by the preparation of a carbonate of zirconium, hafnium or titanium of indeterminate composition, adding said carbonate to a concentrated water solution of the acid whose salt is to be prepared, and stirring vigorously till all reaction ceases, as evidenced by the evolution of $CO_2$.

Such a reaction is obtained with the usual mineral acids, such as hydrochloric, nitric and sulfuric, except boric, and with organic acids, such as formic, lactic, citric, acetic, oxalic, tartaric, benzoic, salicylic, chloracetic, malic, succinic, sulfanilic, cinnamic, picric, etc. Generally, all water soluble acids having a dissociation constant greater than that of carbonic acid will decompose and react with zirconium, hafnium or titanium carbonate and form the corresponding zirconyl, hafnyl or titanyl salt, the dissociation or ionization constant of carbonic acid being $3 \times 10^{-7}$.

There are a variety of ways in which a suitable zirconium carbonate can be made. For example, a solution of a mineral acid salt of zirconium, such as the sulfate, chloride or nitrate, is added to a concentrated solution of sodium, potassium or ammonium carbonate with stirring until a pH of 6 is obtained. In this method, it is noted that the zirconium solution is added to a relatively concentrated carbonate solution, and not vice versa. Reversal of the order of addition of reagents forms a mixture of carbonate and hydrate in which the hydrate will predominate and render the material of less utility for reactions of the above type. At first no visible precipitate is permanently formed, but as the addition progresses a very finely divided white precipitate is secured which is normally complete. At pH much more acid than 6 or much more alkaline than 7, the zirconium complex will tend to dissolve. The precipitate is washed free of soluble salts and the wet filter cake is used as the starting material for subsequent reactions. It is preferred that the product be washed free of the alkali metal or ammonium radical used in forming the carbonate, in view of the tendency of zirconium to form double alkali salts with such acids as oxalic, tartaric, citric, etc., such double salts being quite soluble in warm water. Complete washing of the precipitate eliminates this possibility. However, the washing step may under certain conditions be omitted, especially where the presence of sodium sulfate or ammonium sulfate or other salt resulting from the preparation of the zirconium carbonate is not harmful or is positively helpful.

In carrying out this reaction the specific zirconium salt used requires some minor differentiations in procedure. For example, when using zirconyl chloride ($ZrOCl_2$) as the source of zirconium carbonate, there is relatively little gas evolution, at least until practically all the zirconyl chloride solution has been added. However, when zirconium sulfate solution is used, a vigorous gas evolution is encountered when approximately half of the solution has been added, and continues from that point onwards until the addition is complete. This is due to the fact that, while the empirical formula of the sulfate is $Zr(SO_4)_2.4H_2O$, the compound actually exists in solution as $ZrOSO_4.H_2SO_4.3H_2O$, so that one mol of free acid must be neutralized. It is sometimes desirable to accomplish this before adding to the sodium or ammonium carbonate solution, such as by adding an appropriate amount of NaOH solution. Besides avoiding the vigorous frothing which tends to take place, the expedient of neutralizing before adding to the carbonate solution tends to increase the yield. This may be due to the fact that, on neutralizing zirconium sulfate completely with $Na_2CO_3$, some soluble bicarbonate may be formed in view of the free $H_2SO_4$ present. Even then such bicarbonate can be eliminated by prolonged stirring of the reaction mixture at pH 6.5 to 7.0.

When using zirconium sulfate without prior neutralization, it has been found that, in some cases, abnormally low yields of zirconium carbonate are obtained, irrespective of the care used in neutralization and adjustment of pH. This difficulty is apparently due to the presence of the bicarbonate ion in the wash water, and can be avoided by washing the precipitated zirconyl carbonate with distilled water, previously boiled water, or water brought to a pH of 6.5 to 7.0 with HCl and then decarbonated with lime, instead of tap water. Another difficulty attendant on the use of unneutralized zirconium sulfate is that the vigorous frothing which takes place due to the free acid slows up the speed of reagent addition markedly for obvious mechanical reasons. This violent frothing with attendant tendency to boil over and slow down the speed of reagent mixing may be eliminated by the addition of a minute amount of octyl alcohol. Usually 2 to 3 drops per gallon of reacting solution is sufficient. This reagent acts by means of a reduction of surface tension so that the bubbles break as soon as they reach the surface, and all tendency for boil over is removed.

A zirconium carbonate may also be formed by dispersing the hydrate in water and passing $CO_2$ into the cold slurry for several hours. Much faster absorption of $CO_2$ is obtained if pressure is applied to the zirconia suspension while $CO_2$ is being bubbled in. Another method is to add $CO_2$ snow in lump form to such a suspension in a pressure bottle and allowing the pressure to build up to two or three atmospheres. It is not necessary to wash zirconium carbonate formed by these methods.

Titanium carbonate can also be prepared by several different methods. One method is to add a proper amount of titanium sulfate solution to a fairly concentrated solution of sodium carbonate or ammonium carbonate. In both cases (just as with zirconium) the precipitate first formed appeared to dissolve and as the addition progresses less and less appears to remain in solution. The amount of precipitate going into solution during the early stages of titanium salt addition is more pronounced with ammonium carbonate than with sodium carbonate. A finely divided completely dispersed white precipitate is obtained. In order to obtain the best results, the pH should be maintained between 7 and 8, or in a more alkaline state than the corresponding zirconium derivative. Finally, the completed precipitate should be stirred for at least ½ to 1 hour before filtration. The precipitate is then filtered and washed. It has been found that it is extremely difficult in the case of titanium, to wash entirely free of alkali metal or ammonium, apparently due to the fact that a complex is formed instead of the pure carbonate as in the case of zirconium. Thus, zirconium carbonate prepared from ammonium carbonate can be washed to the extent that no ammonia fumes can be detected on treatment of the moist precipitate with warm concentrated caustic, while in the case of titanium carbonate prepared from ammonium carbonate, a test for an ammonium compound, though light, can always be obtained, irrespective of the time of washing. Evidently, therefore, a true simple carbonate of titanium is not obtained but a complex involving one or more of the radicals used in the original precipitate. The same is true of material prepared from soda ash.

The titanium carbonate is apparently less stable than the corresponding zirconium compound, and should be used as quickly as possible after formation. In this connection it has been found that precipitations finished at pH 6 decomposed much more rapidly than one finished at pH 7 to 8, whereas zirconium carbonate appears to be quite stable at a pH of 6 to 7.

The zirconium or titanium carbonate is then added to the proper amount of stirred acid solution, the acid preferably being in fairly concentrated form, in small increments, so as to avoid excessive frothing and the formation of undesirable by-products. In the cases where the final product is water soluble, the successive increments of carbonate are not added until the previous ones have passed in solution. In any case, it is preferred that the carbonate be added to the acid, since if acid is added to the carbonate the $CO_2$ is eliminated too rapidly and insoluble compounds are formed. By the recommended procedure clear concentrated solutions are obtained when the final product is soluble in water. It is also preferred to have either a slight excess of acid or no excess of either acid or carbonate, in order to avoid the formation of undesirable complexes. In some cases it may be desirable to employ an excess of acid, such as from 10 to 20%, in order to dissolve the product so that it can be recrystallized from solution. This may be done after the reaction is complete, by adding such an excess of the precipitating acid.

In order to avoid the violent heavy frothing which tends to slow up the speed of reagent addition, 2 or 3 drops of octyl alcohol may be added per gallon of acid solution. By this means all tendency for boil over is eliminated, and additions can be rapidly made.

After salts are formed according to the present invention a small amount of formaldehyde, such as from 0.01% to 0.1%, may be added thereto to prevent mold growth, particularly when they are kept in aqueous solution.

By means of the above described methods stable salts of these fourth group elements may be obtained of the general formula $(MO)_aX_2$, with or without water of crystallization, that is, in the case of zirconium they are properly called "zirconyl" salts. In some cases the compound formed is inherently unstable, and in these cases the method of the present invention is not particularly useful. Thus, in the case of titanium acetate, the compound hydrolyzes to hydrate or similar material as fast as formed, nor is the precipitate soluble in excess acid. Furthermore a distinct odor of acetic acid is always evident over either the filtered precipitate or even the precipitation beaker, indicating an adsorption complex. In the case of zirconium, a clear permanently stable substantially odorless solution is obtained with acetic acid.

Examples of how the invention may be practiced are as follows:

Example 1

To a 20% solution of sodium carbonate containing 212 grams of sodium carbonate add 2 to 3 drops of octyl alcohol. To this stirred solution add in a slow steady stream a 25% solution of zirconium sulfate, containing 355.4 grams of zirconium sulfate ($ZrOSO_4.H_2SO_4.3H_2O$). After the addition of the zirconium solution is complete, the reaction is stirred for 10 minutes more and the pH checked. The pH is adjusted to 6-6.5 with soda ash solution or zirconium sulfate solution as the case requires. The finely divided precipitate is filtered, washed free of sulfate ion and is then added to a stirred solution of 120 cc. of glacial acetic acid containing 2 to 3 drops of octyl alcohol, each addition being permitted to dissolve before fresh portions of carbonate are added. When the addition of carbonate is complete a clear concentrated solution is obtained which on slow evaporation yields a water white crystal easily soluble in water.

Example 2

An amount of zirconyl hydrate paste equivalent to one mol of zirconium dioxide is placed in a suitable mixer and sufficient water added to form an easily flowing slurry. The hydrate is completely disintegrated until no lumps are evident and a thinly poured stream shows no rough projections. It is then placed in a pressure bottle and $CO_2$ at 2 to 3 atmospheres pressure is injected for 2 to 4 hours. The carbonate thus formed is added to acetic acid as in Example 1.

Example 3

To an amount of well washed zirconium carbonate precipitate equivalent to 123 grams of zirconium oxide, enough water is added to form a freely flowing paste when violently stirred. This paste is then added slowly with stirring to 1500 cc. of a water solution of 126 grams of $(COOH)_2.2H_2O$ (oxalic acid). Carbon dioxide is evolved copiously throughout the addition. Initially the zirconium carbonate appears to dissolve and then the formation of a bulky precipitate takes place as the addition progresses. After the addition is complete the stirred contents are heated to 50° to 60° C. for about ½ hour to complete the evolution of $CO_2$ and the precipitation of the insoluble oxalate. Two courses are now available for obtention of the final product. The precipitate may be dewatered by filtration and dried or the contents of the reaction vessel may be evaporated to dryness at 60–80° C. and subsequently baked at that temperature for 12 hours. If an anhydrous precipitate is formed, 194 grams would result. Actually 265 grams is obtained, indicating the formula $$ZrO(COO)_2.4H_2O$$

A glassy, coarse, white product is obtained.

Example 4

The same procedure as in Example 3 is followed except that 168 grams of racemic tartaric acid is used in place of oxalic acid and the white granular precipitate is dewatered by filtration. On drying at 60–80° C. a glassy coarse white product is obtained weighing 270 grams which indicates the formula

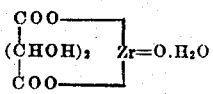

Example 5

To a 20% solution of sodium carbonate containing 212 grams of sodium carbonate is added 2 to 3 drops of octyl alcohol. To this stirred solution is added in a slow steady stream a 40% solution of $Ti(SO_4)_2.9H_2O$ equivalent to 80 grams of $TiO_2$ and containing 402 grams of titanium sulfate crystals. After the addition of the titanium solution is complete, the mixture is stirred for 10 minutes and the pH adjusted to approximately 7.5 with solutions of either soda ash or titanium sulfate as the case may require. The solution is stirred for 45 minutes longer and the pH is again checked. It is then filtered, the precipitate washed with 2 gallons of distilled water for each gallon of original slurry, and the wet precipitate then added to 1500 cc. of oxalic acid solution containing 126 grams of $(COOH)_2.2H_2O$. Carbon dioxide is slowly and continuously evolved. The contents are stirred and heated at 50° to 60° C. for ½ hour or until all the $CO_2$ is completely eliminated. The precipitate is filtered, washed with water once or twice, and dried at 60° to 80° C. for several hours. A coarse, glassy product is obtained weighing 284 grams. The apparent formula is $TiO(COO)_2.8H_2O$, although the amount of water of crystallization may be less than this, due to the fact that part of the weight of the product may be due to the presence of soda.

As many variations are possible within the scope of this invention, it is not intended to be limited except as defined by the appended claims.

I claim:

1. The method of preparing a zirconium salt comprising adding a solution of a zirconium salt to a solution of a carbonate of the group consisting of alkali metals and ammonium, stirring until a pH of approximately 6 is obtained, washing the resulting zirconium carbonate until substantially free from alkali metals and ammonium, gradually adding the washed zirconium carbonate to an aqueous solution of an acid having a dissociation constant greater than that of carbonic acid, and stirring until all reaction has ceased, under such conditions that a compound of the formula $(ZrO)_nX_2$, where X represents the acid radical of the acid reacted with the carbonate and $n$ represents the valency of the acid radical, is formed in substantial quantities.

2. The method of preparing a zirconium salt comprising neutralizing a solution of zirconium sulfate, adding said neutralized solution to a solution of a carbonate of the group consisting of alkali metals and ammonium, stirring until a pH of approximately 6 is obtained, washing the resulting zirconium carbonate until substantially free from alkali metals and ammonium, gradually adding the washed zirconium carbonate to an aqueous solution of an acid having a dissociation constant greater than that of carbonic acid and containing a small amount of octyl alcohol, and stirring until all reaction has ceased, under such conditions that a compound of the formula $(ZrO)_nX_2$, where X represents the acid radical of the acid reacted with the carbonate and $n$ represents the valency of the acid radical, is formed in substantial quantities.

3. The method of preparing a zirconium salt comprising adding a solution of zirconium sulfate to a solution of a carbonate of the group consisting of alkali metals and ammonium, stirring until a pH of approximately 6 is obtained, washing the resulting zirconium carbonate with water substantially free from bicarbonate ion until substantially free from alkali metals and ammonium, gradually adding the washed zirconium carbonate to an aqueous solution of an acid having a dissociation constant greater than that of carbonic acid and containing a small amount of octyl alcohol, and stirring until all reaction has ceased, under such conditions that a compound of the formula $(ZrO)_nX_2$, where X represents the acid radical of the acid reacted with the carbonate and $n$ represents the valency of the acid radical, is formed in substantial quantities.

4. The method of preparing a salt of an element taken from the class consisting of zirconium, hafnium and titanium, comprising adding an aqueous solution of a salt of said element to a solution of a carbonate of the group consisting of alkali metals and ammonium, stirring until a pH of at least 6 is obtained, washing the resulting precipitate, and adding the washed precipitate to an aqueous solution of an acid having a dissociation constant greater than that of carbonic acid, under such conditions that a compound of the formula $(MO)_nX_2$, where M represents an element of said class, X represents the acid radical of the acid reacted with the carbonate, and $n$ represents the valency of the acid radical, is formed in substantial quantities.

5. The method of preparing a salt of an element taken from the class consisting of zirconium, hafnium and titanium, comprising adding an aqueous solution of a salt of said element to a solution of a carbonate of the group consisting of alkali metals and ammonium, stirring until a pH of at least 6 is obtained, washing the resulting precipitate, gradually adding the washed precipitate to an aqueous solution of an acid having a dissociation constant greater than that of carbonic acid, and stirring until all reaction has ceased, under such conditions that a compound of the formula $(MO)_nX_2$, where M represents an element of said class, X represents the acid radical of the acid reacted with the carbonate, and $n$ represents the valency of the acid radical, is formed in substantial quantities.

6. The method of preparing a salt of an element taken from the class consisting of zirconium, hafnium and titanium, comprising adding an aqueous solution of a salt of said element to a solution of a carbonate of the group consisting of alkali metals and ammonium, stirring until a pH of at least 6 is obtained, washing the resulting precipitate, gradually adding the washed precipitate to an aqueous solution of an acid having a dissociation constant greater than that of carbonic acid and containing a small amount of octyl alcohol, and stirring until all reaction has ceased, under such conditions that a compound of the formula $(MO)_nX_2$, where M represents an element of said class, X represents the acid radical of the acid reacted with the carbonate, and $n$ represents the valency of the acid radical, is formed in substantial quantities.

7. The method of preparing an oxalate of an element taken from the class consisting of zirconium, hafnium and titanium, comprising adding an aqueous solution of a salt of said element to a solution of a carbonate of the group consisting of alkali metals and ammonium, stirring until a pH of at least 6 is obtained, washing the resulting precipitate, adding the washed precipitate to an aqueous solution of oxalic acid, under such conditions that a compound of the formula $MO(COO)_2$, where M represents an element of said class, is precipitated in substantial quantities, and separating said compound.

8. The method of preparing an oxalate of an element taken from the class consisting of zirconium, hafnium and titanium, comprising adding an aqueous solution of a salt of said element to a solution of a carbonate of the group consisting of alkali metals and ammonium, stirring until a pH of at least 6 is obtained, washing the resulting precipitate, gradually adding the washed precipitate to an aqueous solution of oxalic acid containing a small amount of octyl alcohol, and stirring until reaction has ceased, under such conditions that a compound of the formula $MO(COO)_2$, where M represents an element of said class, is precipitated in substantial quantities, and separating said compound.

9. The method of preparing zirconyl oxalate comprising adding an aqueous solution of a zirconium salt to a solution of a carbonate of the group consisting of alkali metals and ammonium, stirring until a pH of approximately 6 is obtained, washing the resulting zirconium carbonate until substantially free from alkali metals and ammonium, gradually adding the washed zirconium carbonate to an aqueous solution of oxalic acid, under such conditions that zirconyl oxalate is precipitated, stirring until all reaction has ceased, and separating the precipitate formed.

10. The method of preparing zirconyl oxalate comprising adding an aqueous solution of a zirconium salt to a solution of a carbonate of the group consisting of alkali metals and ammonium, stirring until a pH of approximately 6 is obtained, washing the resulting zirconium carbonate until substantially free from alkali metals and ammonium, gradually adding the washed zirconium carbonate to an aqueous solution of oxalic acid containing a small amount of octyl alcohol, under such conditions that zirconyl oxalate is precipitated, stirring until all reaction has ceased, and separating the precipitate formed.

EUGENE WAINER.